United States Patent Office 3,520,601
Patented July 14, 1970

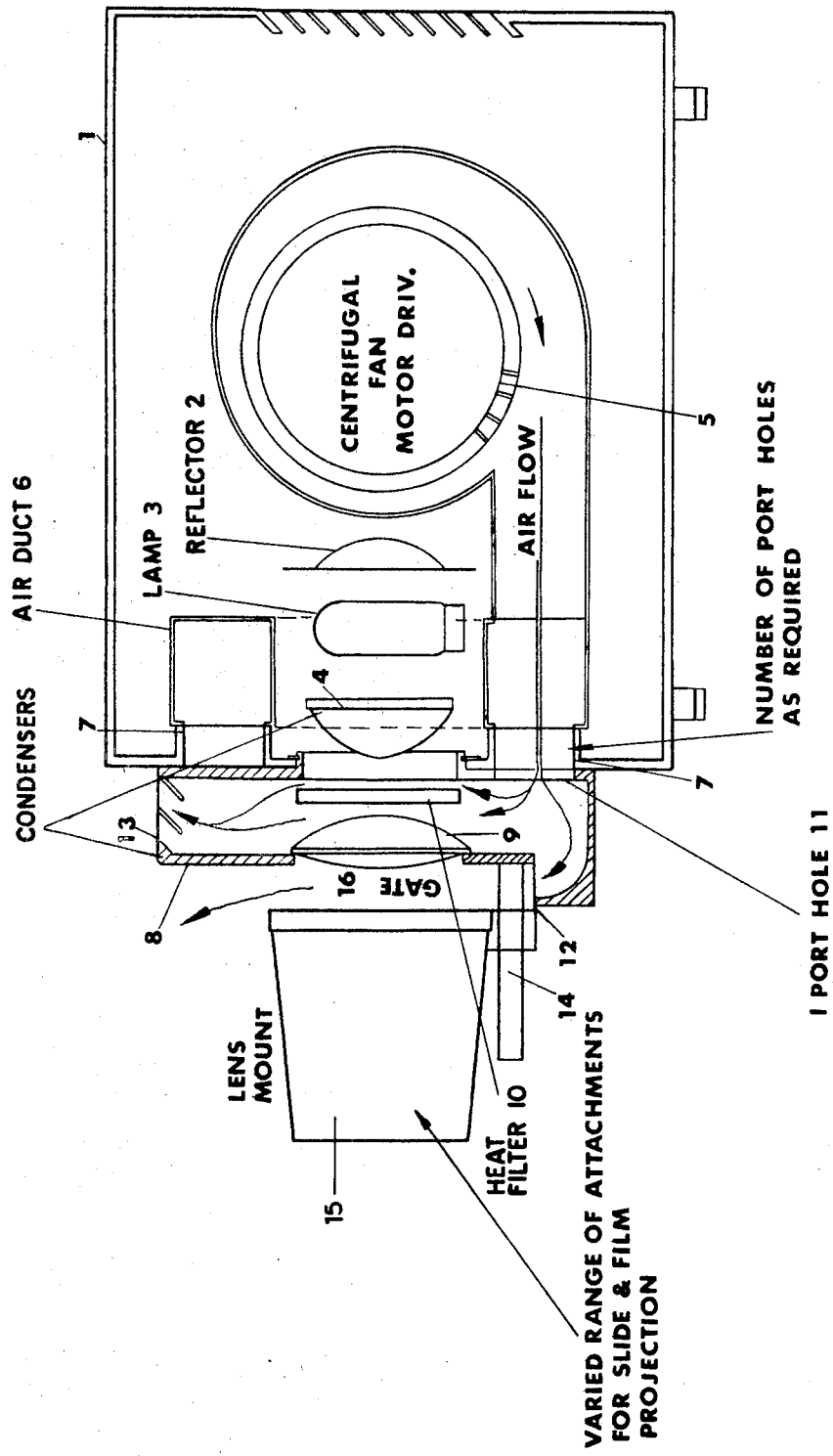

3,520,601
ROTATABLE PROJECTION ASSEMBLY
Donald Abbott, Acocks Green, Birmingham, England, assignor to The Rank Organisation Limited
Filed Feb. 23, 1967, Ser. No. 618,116
Claims priority, application Great Britain, Feb. 23, 1966, 8,019/66
Int. Cl. G03b 21/16
U.S. Cl. 353—61                      7 Claims

ABSTRACT OF THE DISCLOSURE

An optical projector for film strips, slides or other accessories comprising in combination a source of illumination, an optical lens system, and in association therewith, a hollow casing comprising a gate mounted to be rotatable about the optical path and providing a carrier for the film strips, slides or other accessories. By rotating the casing an individual picture can be turned about a fixed axis, generally an axis passing through the center of the picture. A fan is provided to deliver cooling air to a distributing duct which has outlets spaced angularly apart around the optical path so as to register with an inlet port in the rotatable casing in each of the positions in which the casing is designed to be held during projection.

---

Figure 1:
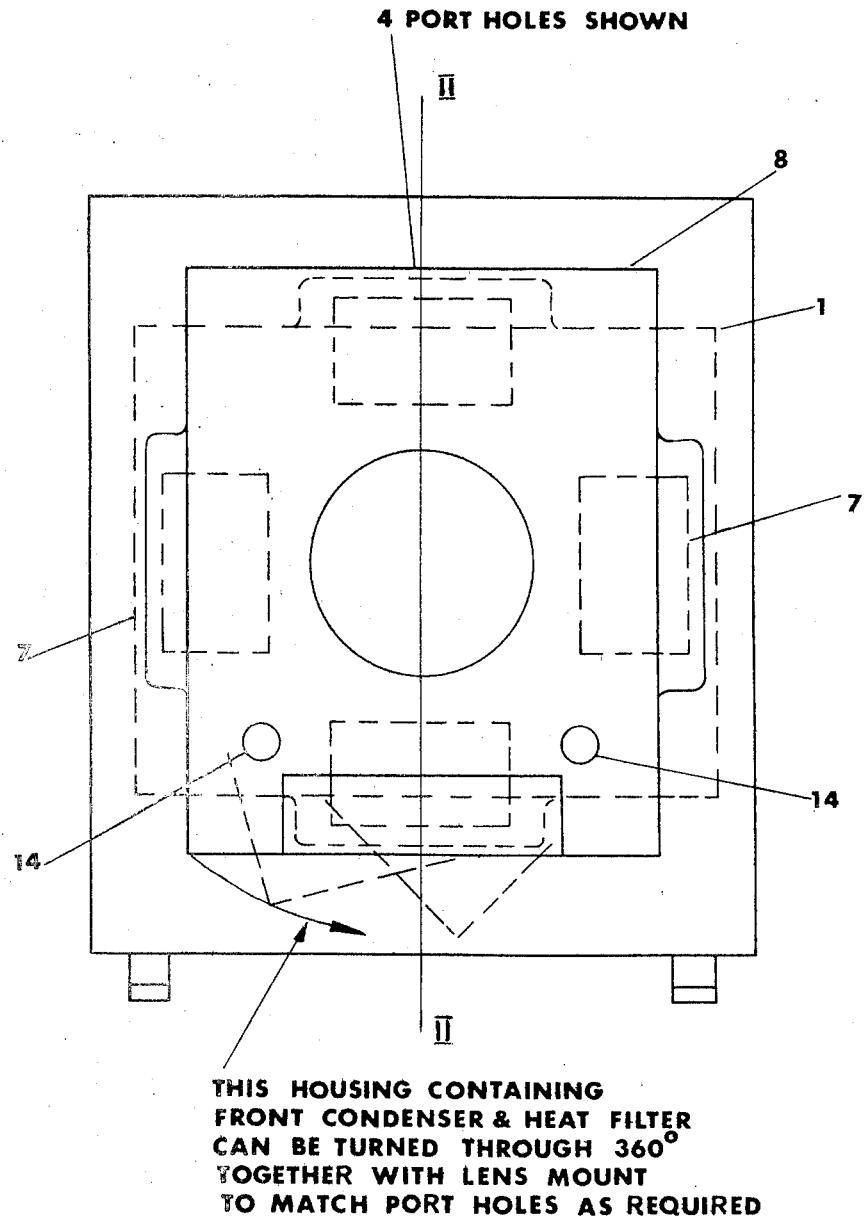

The present invention concerns optical projectors and is particularly, but not exclusively concerned with projectors which can accept a variety of attachments such as slide carriers and film strip carriers of various forms. Projectors of this kind are often used for educational purposes and an essential feature of educational projectors is that they must be versatile. Thus, the projectors should be capable of accepting different accessories, and one of these accessories is a film winder which projects images which may be disposed at 90° to each other along the length of the film. To accommodate this, provision must be made to rotate the film winder attachment through 90° on bearer bars. In previous projectors this necessity for rotation of the accessories to be used with the projectors, have resulted in two serious disadvantages incorporated in projectors of this kind. The first of these disadvantages is that the duct providing air to the gate of the projector has to be fairly remote from the slide in order that is should not interfere with the rotating accessories. The second disadvantage is that this distance between the slide and the duct providing cooling air, which is normally at the bottom of the projector, means that the height from the optical centre line to the foot of the projecor is fairly high.

The invention has for an object to at least reduce these disadvantages.

According to the present invention there is provided an optical projector comprising a gate in which a transparency bearing a subject to be projected can be mounted so as to be in the optical path of the projector, a rotatable member capable of rotary movement into a plurality of operative positions about said optical path interposed between said gate and the light source of said projector, and means for supplying cooling air to said gate and said rotary member, the arrangement being such that the amount of cooling air supplied to said gate remains substantially constant irrespective of the operative position of said rotary member.

The said rotatable member may be capable of carrying a variety of accessories, such as various forms of slide carriers or film winders. The said rotatable member may comprise a hollow casing carrying a condenser lens and a heat filter and having an air inlet port which can be connected to the means for supplying cooling air, and an outlet port directed towards said gate.

The means for supplying cooling air may comprise a motor driven fan which can deliver air to a plurality of outlet ports, only one of said outlet ports being in register with the inlet port of said rotary member at any one moment, the outlet port in register being determined by the operative position of said rotary member.

The fan may supply air to an inlet duct surrounding the optical path of said projector, said duct being formed with four outlet ports which are spaced at 90° intervals around the duct. A sealing ring may be interposed between said rotary member and the casing of said projector to prevent leakage of air.

One embodiment of the present invention will now be particularly described hereinafter by way of example and with reference to the accompanying drawings in which FIG. 1 is an end view of a projector constructed in accordance with the present invention and FIG. 2 is a section on line 2—2 of FIG. 1.

The projector shown in the accompanying drawings comprises a housing 1 in which is located a reflector 2, a lamp 3 and a rear condenser lens 4. Also located within the housing 1 are means for supplying cooling air comprising a centrifugal fan 5 driven by a suitable electric motor which is not shown. The fan 5 blows air into an annular air duct 6 surrounding the lamp 3. The duct 6 is provided with four rectangular ports or air outlets 7 which are spaced at 90° intervals around the optical axis of the projector. A rotary member in the form of a hollow casing 8 is mounted on the housing 1 so that it is free to rotate about the optical path of the projector, and this casing 8 carries a front condenser lens 9 and a heat filter 10. The casing 8 is also formed with a single port or air inlet 11 and with outlet openings 12 and 13.

A pair of rods 14 project from the casing 8 and as shown in FIG. 1 of the drawings, carry a lens mount 15. However, the lens mount 15 can be replaced by a variety of attachments for slide and film projectors. The space between the lens mount 15 and the casing 8 is the gate 16 in which a transparency bearing a subject to be projected is mounted in the optical path of the projector. The transparency could be a slide or part of a film strip.

The fact that the casting 8 can be rotated into any one of four operative positions means that the projector can accept such accessories as a film winder which projects images which may be disposed at 90° to each other along the length of the film. To accommodate this, the accessory has to be capable of rotation through 90°. However, the arrangement of the single air inlet 11 on the casing 8 in conjunction with the four air outlets 8 from the air duct 6 means that the casing and the gate 16 between the casing and the accessory will always have the necessary circulation of the cooling air from the fan 5, as in any one operative position the air inlet 11 will be in register with an outlet port 7. Air is prevented from escaping between the stationary housing 1 and the rotary casing 8 by means of a suitable sealing means which may comprise an O-ring surrounding the air outlets 6.

The rotary casing 8 is maintained in its required angular position relative to the housing 1 by means of a spring-loaded ball carried by the casing 8 and engaging in one of four suitably positioned detents, although any other suitable means may be used.

The projector may, of course, use a different type of fan, and the number of outlet ports in the duct 6 may of course vary in accordance with the number of operative positions required for the casing 8. It is conceivable that the duct 6 may have a single annular outlet so that the casing 8 would at any angular position be receiving a supply of cooling air.

An advantage of the projector described is that cooling air for the gate 16 is supplied by a duct which is in close proximity to the gate 16. In previous systems the end of the duct had to be sufficiently far below the gate to provide clearance for the accessories to rotate about the optical path of the projector. This meant increased height between the optical centre line and the foot of the projector and also loss of cooling efficiency because of remoteness of the duct from the gate.

I claim:

1. An optical projector comprising in combination a housing having means for producing a source of light and also part of an associated optical system mounted therein, a hollow chamber rotatably supported adjacent the housing to turn about the optical axis into any one of plurality of predetermined angularly spaced positions, said chamber being provided with a gate for reception of a transparency to be projected and being formed with inlet and outlet ports leading to the interior of the chamber, and a ventilating air duct mounted within said housing and surrounding the optical axis; said air duct having inlet and outlet therein so relatively disposed with respect to the inlet and outlet ports in the said chamber that in each angular position of adjustment of the latter communication will be established between the said duct and the interior of said chamber and the airflow through that chamber will be directed to follow the same path irrespective of the angular position of the chamber.

2. An optical projector as claimed in claim 1 wherein the hollow chamber has an inlet port and an outlet port on opposite sides thereof, and the air duct has a plurality of outlet ports so angularly spaced that only one of them will register with the inlet port of the chamber in each position of angular adjustment of the latter.

3. An optical projector as claimed in claim 2 wherein the hollow chamber is formed with its inlet port opening into a lateral wall thereof, and that wall is in sliding engagement with a wall through which the outlet ports from the air duct open, all of which ports with the exception of that in register with the inlet port of the said chamber will be blanked off by the said lateral wall surface.

4. An optical projector as claimed in claim 3 wherein the wall through which the outlet ports open from the air duct is one wall of said housing.

5. An optical projector as claimed in claim 1 wherein the hollow rotatable chamber carries at least a condenser lens and a heat filter.

6. An optical projector as claimed in claim 1 wherein the said air duct is provided with four outlet ports spaced at 90° intervals around the duct, in combination with a fan for supplying air to the inlet port of the duct.

7. An optical projector as claimed in claim 1 in which the gate and the hollow chamber constitute an unitary structure.

References Cited

UNITED STATES PATENTS

| | | | |
|---|---|---|---|
| 1,966,531 | 7/1934 | Tint | 353—61 |
| 1,989,336 | 1/1935 | Pollard | 353—61 |
| 2,229,760 | 1/1941 | Mueller | 353—61 |
| 2,243,160 | 5/1941 | Koehl | 353—68 |
| 2,252,513 | 8/1941 | Koehl | 353—100 |
| 2,614,458 | 10/1952 | Critoph et al. | 353—61 |
| 2,362,601 | 11/1944 | Wengel. | |
| 2,461,756 | 2/1949 | Moore. | |
| 2,597,449 | 5/1952 | Cassidy et al. | |

NORTON ANSHER, Primary Examiner

R. M. SHEER, Assistant Examiner

U.S. Cl. X.R.

353—55, 57, 60, 68, 96, 101